H. E. MAINE.
COFFEE FILTER.
APPLICATION FILED MAR. 4, 1915.

1,175,282. Patented Mar. 14, 1916.

Witnesses.
W. W. Bardsley
F. W. Emerson

Inventor.
Herbert E. Maine.
By Geo. H. Remington
Atty.

UNITED STATES PATENT OFFICE.

HERBERT E. MAINE, OF PROVIDENCE, RHODE ISLAND.

COFFEE-FILTER.

1,175,282.　　　　　Specification of Letters Patent.　　Patented Mar. 14, 1916.

Application filed March 4, 1915. Serial No. 12,127.

*To all whom it may concern:*

Be it known that I, HERBERT E. MAINE, a citizen of the United States, residing at Providence, in the county of Providence and State of Rhode Island, have invented certain new and useful Improvements in Coffee-Filters, of which the following is a specification.

My invention relates to filter devices of the class adapted more especially for use in the brewing or making of coffee for a beverage, and it consists in the novel construction and arrangement of parts, substantially as hereinafter set forth and claimed.

Coffee filters or percolators as usually devised are somewhat complicated and expensive to manufacture, and when in use require a considerable length of time and skill to successfully extract the desirable qualities from the coffee.

By means of the filter embodying my improvement and forming the subject of this application for patent, the cost of production is greatly reduced; it is extremely simple in construction and in the manner of its use, and is not liable to become accidentally inoperative. It may be added that the filter eliminates the need of percolators proper, coffee-pots, urns, or other similar vessels, thereby saving their cost, reducing the length of time consumed in making the coffee, and lessening the consequent labor involved in keeping the said percolators, etc., clean for instant use.

Figure 1:
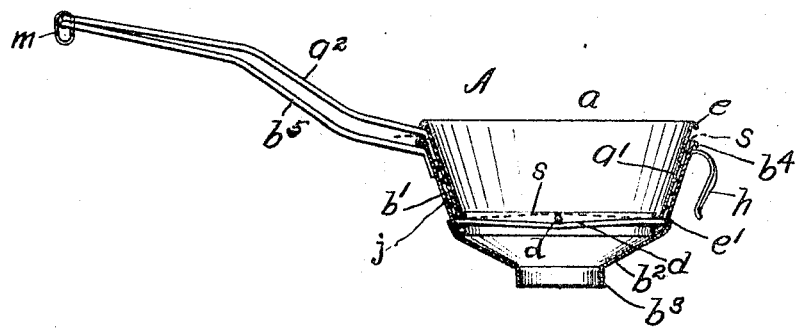
Figure 2:
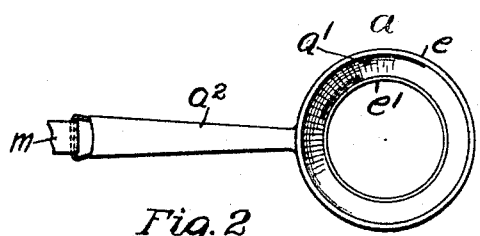
Figure 3:
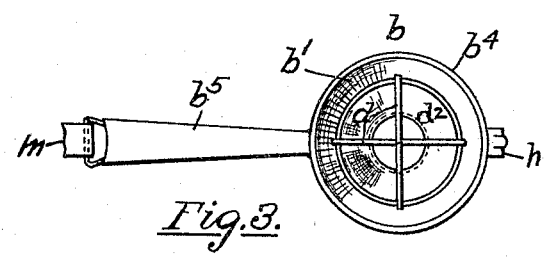
Figure 4:
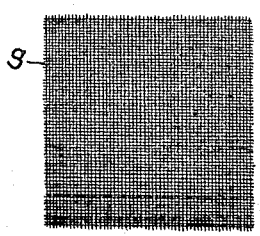

In the accompanying drawing illustrating my improved filter, Figure 1 is a central longitudinal sectional view of the normally assembled device, arranged to receive the granulated coffee and hot water; Fig. 2 is a plan view in reduced scale of the upper section member of the holder or filter device; Fig. 3 is a plan view of the lower section, detached from the said upper member; and Fig. 4 represents a piece of woven textile fabric of suitable mesh adapted to be positioned between the sections.

My improved filter device, indicated by the letter A, Fig. 1, is provided with a centrally open circular upper inner section member $a$ having imperforate flaring, comparatively shallow side walls $a^1$ and a handle $a^2$. The filter also includes in its construction the coöperating centrally open, circular outer lower section $b$ having flaring side walls $b^1$ arranged to receive and support the said upper section $a$. At or near the lower edge $e^1$ of the last-named section $a$, the said wall $b^1$ slopes inwardly and downwardly at a less inclination as at $b^2$, and terminates in the reduced central, annular neck or collar part $b^3$ having an open delivery end. At the inner junction of the said wall portion $b^1$ with the side wall $b^2$ the latter is provided with a pair of fixed rods $d$ crossing each other at right angles in a horizontal plane. These rods support the textile strainer element $s$ on which latter the suitably ground coffee rests while hot water is being poured thereon to extract the desirable or aromatic properties of the coffee and deliver it, then dissolved by the hot water, from the neck $b^3$ into a suitable receptacle placed below for the purpose.

The upwardly extending sides of the flexible strainer $s$ may project beyond the upper edge $b^4$ of the outer section $b$ as indicated sectionally in Fig. 1. The member $b$ is provided with a fixed hook $h$ arranged to engage the upper edge of a pitcher, cup, or other suitable vessel positioned to receive the coffee as it is brewed. The lower section $b$ is also provided with a handle $b^5$. The handles of the respective sections are substantially alike and parallel with each other and coupled or jointed together at their outer ends by a link $m$, as indicated in Fig. 1. An annular air space $j$ is formed between the contiguous sides $a^1$ and $b^1$ of the sections by the extension of the walls of the strainer member $s$, whereby said air space is produced.

By providing the upper inner section $a$, with a comparatively large open lower end having the textile member or strainer $s$ interposed between the said open end and the fixed supporting bars $d$, the device forms a plurality of horizontal sector-like divisions $d^2$, on which the strainer carrying the granulated coffee is supported. As thus arranged the infusion passes through the said depressions instead of through a single central depression, as would be the case if the bars were absent, thereby materially shortening the process of percolation.

By means of the central circular air-jacket $j$ formed by the strainer $s$ positioned between the contiguous imperforate sides $a^1$ and $b^1$ of the respective sections $a$ and $b$ when they are nested together, the liquid may be maintained at a more even temperature during its brief percolation through the coffee and strainer $s$.

My improved coffee-filter, as thus devised, permits inspection of the open vessel $a$ and its contents at any time during the coffee-making operation; the said air-space, between the sides $a^1$ and $b^1$ of the sections serves to materially prevent loss of heat by radiation, thus maintaining the high temperature of the hot water which is desirable; the fluid leached through the coffee and strainer $s$ is translucent and free from sediment or muddiness; the device retains the granular coffee against movement or agitation, and metal or material of the parts is not brought into contact with the coffee-extracted fluid. After the boiling water has percolated through the coffee the section $a$ is lifted from the lower section, the strainer, together with the coffee-grounds thereon, are next removed from the lower section and discarded, followed by rinsing in hot water the two sections $a$, $b$, and rods $d$ and drying them.

Obviously, the device may be employed for other uses, although primarily it is more particularly adapted for use in coffee-making.

I claim as my invention:—

1. The combination of a pair of separable centrally open concentrically arranged circular members having imperforate flaring side walls constituting outer and inner sections, respectively, the said outer section extending beyond the lower end of the other or inner section, a textile filter element extending transversely across the lower end of the said inner section member, the strainer element extending up between the contiguous walls of the sections and forming an air space, and substantially level bars adapted to support the filter element, the said filter and its supporting bars adapted, when in use, to form a plurality of shallow depressions or pockets for facilitating the brewing operation.

2. In a coffee filter device of the general character described, the combination with a pair of centrally open circular members comprising inner and outer sections having inclined downwardly extending imperforate side walls, said members being removably seated one within the other, of a one-piece textile strainer element snugly held between the flaring walls of the sections, whereby an air space is formed, the base portion of the strainer extending flatwise transversely across the lower end of the inner section, and inner horizontal bars supporting the base portion of the strainer.

In testimony whereof I have affixed my signature in presence of two witnesses.

HERBERT E. MAINE.

Witnesses:
CHARLES C. REMINGTON,
GEO. H. REMINGTON.